US007054267B2

(12) United States Patent
Ramanan et al.

(10) Patent No.: US 7,054,267 B2
(45) Date of Patent: May 30, 2006

(54) METHOD AND APPARATUS FOR SCHEDULING TRAFFIC TO MEET QUALITY OF SERVICE REQUIREMENTS IN A COMMUNICATION NETWORK

(75) Inventors: Kavita Ramanan, New Providence, NJ (US); Aleksandr Stoylar, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/393,949

(22) Filed: Sep. 10, 1999

(65) Prior Publication Data

US 2003/0185224 A1 Oct. 2, 2003

(51) Int. Cl.
*H04L 12/26* (2006.01)
*H04L 12/28* (2006.01)
(52) U.S. Cl. ........................ 370/229; 370/414; 370/417
(58) Field of Classification Search ................ 370/230, 370/230.1, 232–235, 252, 395.21, 412–418
See application file for complete search history.

(56) References Cited

U.S. PATENT DOCUMENTS

| 5,796,719 | A | * | 8/1998 | Peris et al. ................. 370/231 |
| 5,886,980 | A | * | 3/1999 | Zheng ......................... 370/230 |
| 5,917,822 | A | | 6/1999 | Lyles et al. |
| 6,009,077 | A | * | 12/1999 | Firoiu et al. ................ 370/230 |
| 6,091,709 | A | * | 7/2000 | Harrison et al. ............ 370/235 |
| 6,092,115 | A | * | 7/2000 | Choudhury et al. ........ 709/235 |

(Continued)

FOREIGN PATENT DOCUMENTS

WO   WO 97/14240   4/1997

OTHER PUBLICATIONS

L. Georgiadis, R. Guerin and A. Parekh, "Optimal multiplexing on a single link: delay and buffer requirements," IEEE Transactions on Information Theory, 43(5): 1518-1535, 1997.

(Continued)

*Primary Examiner*—Chau Nguyen
*Assistant Examiner*—Soon D. Hyun

(57) ABSTRACT

Packets are scheduled for transmission over a communication link in a network, using a Largest Weighted Delay First (LWDF) scheduling policy. A delay measure $W_i$, i=1, 2, ... N, is computed for each of N packets, each associated with a corresponding one of N data flows and located in a head position in a corresponding one of N data flow queues. The computed delay measures are then weighted using a set of positive weights $\alpha_1, \alpha_2, \ldots, \alpha_N$. The packet having the largest weighted delay $W_i/\alpha_i$ associated therewith is then selected for transmission. In an embodiment configured to meet a quality of service (QoS) requirement specified in terms of a deadline $T_i$ and an allowed deadline violation probability $\delta_i$, e.g., a requirement specified by $P(W_i > T_i) \leq \delta_i$, the weights $\alpha_i$ in the set of positive weights $\alpha_1, \alpha_2, \ldots, \alpha_N$ may be given by $\alpha_i = -T_i/\log \delta_i$. The invention can also be used to meet other types of QoS requirements, including, e.g., requirements based on packet loss probabilities. For example, the QoS guarantee may be defined for a delay measure in the form of queue length $Q_i$, i=1, 2, ... N, and an allowed queue length violation probability $\delta_i$. In such an embodiment, the QoS requirement is specified by $P(Q_i > H_i) \leq \delta_i$, and the weights $\alpha_i$ in the set of positive weights $\alpha_1, \alpha_2, \ldots, \alpha_N$ may be given by $\alpha_i = -H_i/\log \delta_i$, where $H_i$ represents an upper bound on the length of the queue.

28 Claims, 3 Drawing Sheets

U.S. PATENT DOCUMENTS

| | | | |
|---|---|---|---|
| 6,104,700 A * | 8/2000 | Haddock et al. | 370/235 |
| 6,108,307 A * | 8/2000 | McConnell et al. | 370/235 |
| 6,201,793 B1 * | 3/2001 | Chen et al. | 370/238 |
| 6,226,266 B1 * | 5/2001 | Galand et al. | 370/235 |
| 6,317,416 B1 | 11/2001 | Giroux et al. | |
| 6,359,861 B1 * | 3/2002 | Sui et al. | 370/230 |
| 6,408,006 B1 * | 6/2002 | Wolff | 370/412 |
| 6,452,933 B1 * | 9/2002 | Duffield et al. | 370/415 |
| 6,490,248 B1 * | 12/2002 | Shimojo | 370/229 |
| 6,532,213 B1 * | 3/2003 | Chiussi et al. | 370/230.1 |

OTHER PUBLICATIONS

J. Liebeherr, D. Wrege, and D. Ferrari, "Exact admission control for networks with a bounded delay service," IEEE/ACM Transactions on Networking, 4(6):885-901, 1996.

M. Andrews, L. Zhang, "Minimizing End-to-End Delay in High-Speed Networks with a Simple Coordinated Schedule," IEEE INFOCOM'99, pp. 380-388, 1999.

A. Birman et al., "An Optimal Service Policy for Buffer Systems," Journal of the Association Computing Machinery (JACM), vol. 42, No. 3, pp. 641-657, 1995.

H.R. Gail et al., "Buffer Size Requirements Under Longest Queue First," Performance Evaluation, vol. 18, pp. 133-140, 1993.

T. Marosits et al., "Performance Evaluation of a General Traffic Control Framework in ATM Networks," 18th IEEE International Performance, Computing, and Communications Conference (IPCCC'99), Scottsdale, Arizona, pp. 240-249, Feb. 1999.

T-G. Kwon et al., "Scheduling Algorithm for Real-Time Burst Traffic Using Dynamic Weighted Round Robin," Proceedings of the IEEE International Symposium on Circuits and Systems (ISCAS '98), Monterey, California, pp. VI-506-VI-509, May 1998.

* cited by examiner

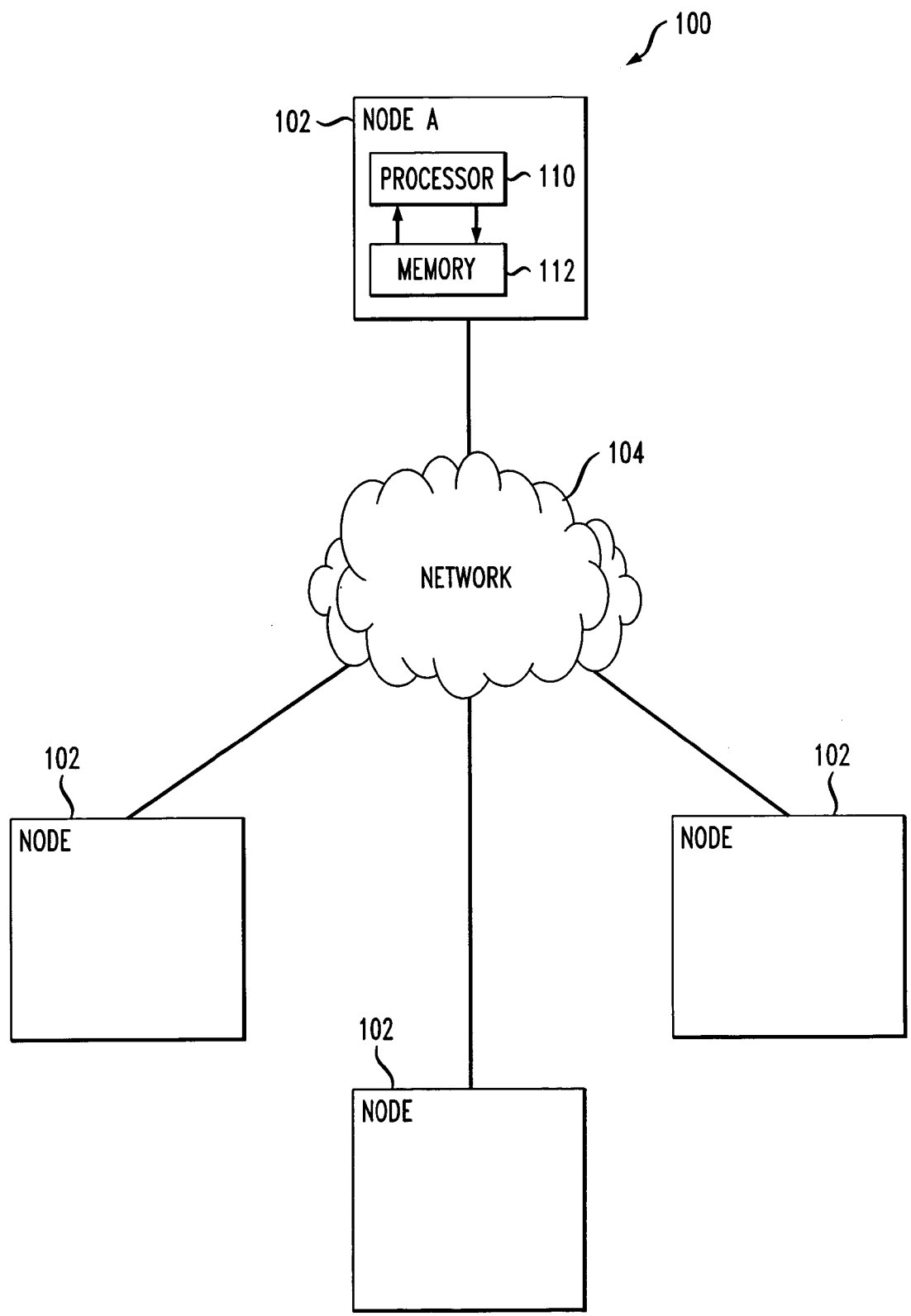

METHOD AND APPARATUS FOR SCHEDULING TRAFFIC TO MEET QUALITY OF SERVICE REQUIREMENTS IN A COMMUNICATION NETWORK

FIELD OF THE INVENTION

The present invention relates generally to communication networks, and more specifically to scheduling techniques for controlling the transfer of data through such networks.

BACKGROUND OF THE INVENTION

A very important and challenging problem in the design of high-speed communication networks is that of providing Quality of Service (QoS) guarantees, usually specified in terms of loss probabilities or packet delays in the network. For example, the control of packet delays is often of crucial importance, particularly for real-time applications such as video delivery systems, wireless networks, multimedia networks, call centers, etc. A basic decision that has to be made in such contexts is that of connection admission control, i.e., one has to determine when a new user can be admitted to the system, while still fulfilling the QoS requirements of all users already in the system. Moreover, users already in the system have to be scheduled in the most efficient manner so as to maximize the number of users that can be admitted into the system. Unfortunately, conventional scheduling techniques are unable to provide adequate QoS guarantees.

A number of these conventional scheduling techniques are based on deterministic QoS guarantees, as opposed to probabilistic guarantees. For example, in L. Georgiadis, R. Guerin and A. Parekh, "Optimal multiplexing on a single link: delay and buffer requirements," IEEE Transactions on Information Theory, 43(5):1518–1535, 1997, and J. Liebeherr, D. Wrege, and D. Ferrari, "Exact admission control for networks with a bounded delay service," IEEE/ACM Transactions on Networking, 4(6):885–901, 1996, it has been shown that an Earliest Deadline First (EDF) scheduling technique is optimal in the context of providing deterministic QoS guarantees for a single node of a communication network. Another known technique, Coordinated EDF (CEDF), described in M. Andrews, L. Zhang, "Minimizing End-to-End Delay in High-Speed Networks with a Simple Coordinated Schedule," IEEE INFOCOM'99, pp. 380–388, 1999, uses randomness to spread out packet transmission deadlines.

It is generally believed that deterministic QoS requirements such as those associated with the above-noted conventional scheduling techniques can lead to an overly conservative admission policy, and a consequent decrease in system throughput. In contrast, probabilistic QoS requirements usually provide the very advantageous trade off of a small amount of QoS for a large capacity gain. A need therefore exists for improved scheduling techniques that can meet probabilistic QoS requirements.

SUMMARY OF THE INVENTION

The invention provides an improved scheduling policy, referred to herein as Largest Weighted Delay First (LWDF) scheduling, which can be used to meet probabilistic QoS requirements in a communication network. In accordance with the invention, a link scheduler associated with a node of a communication network selects packets for transmission over a communication link of the network. The link scheduler computes a delay measure $W_i$, i=1, 2, ... N, for each of N packets, where each of the N packets is associated with a corresponding one of N data flows and located in a head position in a corresponding one of N data flow queues in the network node. The delay measure for a given one of the packets may be computed, e.g., as a difference between a current time and an arrival time of the given packet in its corresponding queue in the network node. The link scheduler weights the computed delay measures using a set of positive weights $\alpha_1, \alpha_2, \ldots, \alpha_N$, and then selects for transmission the particular packet having the largest weighted delay associated therewith.

In an illustrative embodiment of the invention configured to meet a QoS requirement specified in terms of a transmission deadline time $T_i$ and an allowed deadline violation probability $\delta_i$, e.g., a requirement specified by $P(W_i > T_i) \leq \delta_i$, the weights $\alpha_i$ in the set of positive weights $\alpha_1, \alpha_2, \ldots, \alpha_N$ may be given by $\alpha_i = -T_i / \log \delta_i$.

Advantageously, the invention can also be used in a manner similar to that described above to meet a variety of other types of probabilistic QoS requirements, including, e.g., requirements based on packet loss probabilities. For example, the QoS guarantee may be defined for a delay measure in the form of queue length $Q_i$, i=1, 2, ... N, and an allowed queue length violation probability $\delta_i$. In such an embodiment, the QoS requirement is specified by $P(Q_i > H_i) \leq \delta_i$, and the weights $\alpha_i$ in the set of positive weights $\alpha_1, \alpha_2, \ldots, \alpha_N$ may be given by $\alpha_i = -H_i / \log \delta_i$, where $H_i$ represents an upper bound on the length of the queue.

The LWDF scheduling in the above-noted illustrative embodiments of the present invention is optimal in the sense that it maximizes the asymptotic rate of decay of the tails of a stationary maximal-weighted delay or queue length within a general class of scheduling policies. Thus, whenever it is feasible to satisfy specified QoS constraints, one would expect that LWDF would do so. However, in cases when it is not feasible, the LWDF scheduling policy of the illustrative embodiment will most likely violate the QoS constraints of most users. This has significant implications for flow admission control. Most importantly, LWDF in the illustrative embodiment allows one to detect in real time the infeasibility of satisfying QoS requirements. In addition, even when the QoS constraints are infeasible, LWDF in the illustrative embodiment has the property of fairness, in that it tries to equalize for all users the ratio of the logarithm of actual violation probability to the logarithm of the desired probability.

The LWDF scheduling of the invention provides a number of other advantages. For example, the form of the algorithm is invariant to changes in stochastic input flow models. In addition, it is suitable for use in a wide variety of communication network applications, including wireless networks, high-speed multimedia networks, call centers, etc.

The scheduling techniques of the present invention may be implemented at least in part in the form of one or more software programs running on a computer or other type of programmable digital processor.

BRIEF DESCRIPTION OF THE DRAWINGS

FIG. 3 shows a block diagram of an exemplary communication network in which the invention may be implemented.

DETAILED DESCRIPTION OF THE INVENTION

The present invention will be illustrated below in conjunction with exemplary scheduling techniques implemented in a link scheduler associated with a particular node of a communication network. It should be understood, however, that the invention is not limited to use with any particular type of communication network device or network configuration. The disclosed techniques are suitable for use with a wide variety of other systems and in numerous alternative applications. The term "packet" as used herein is intended to include any grouping or other arrangement of data suitable for transmission over a communication network link. A given "packet" in accordance with this definition may therefore include only a single bit. The term "delay measure" as used herein is intended to include not only time-based measures, but also other types of measures indicative of delay, such as, e.g., queue length measures.

An illustrative embodiment of the invention optimally schedules classes of heterogeneous users in a communication network in order to meet stipulated QoS requirements for each class, as specified in terms of a deadline $T_i$ and an allowed violation probability $\delta_i$. More specifically, assuming there are N classes of users and $W_i$ is a delay associated with a packet of the ith class, then the illustrative embodiment provides an optimal scheduling policy that meets the given QoS constraints $$P(W_i > T_i) \leq \delta_i \text{ for } i=1, \ldots, N. \quad (1)$$

This can alternatively be expressed as an optimal scheduling policy which maximizes the quantity $$\min_{i=1,\ldots,N} \frac{\log P(W_i > T_i)}{\log \delta_i}. \quad (2)$$

As will be described in greater detail below, feasibility of the QoS constraints can then be determined by analyzing the performance of this optimal policy.

Figure 1:
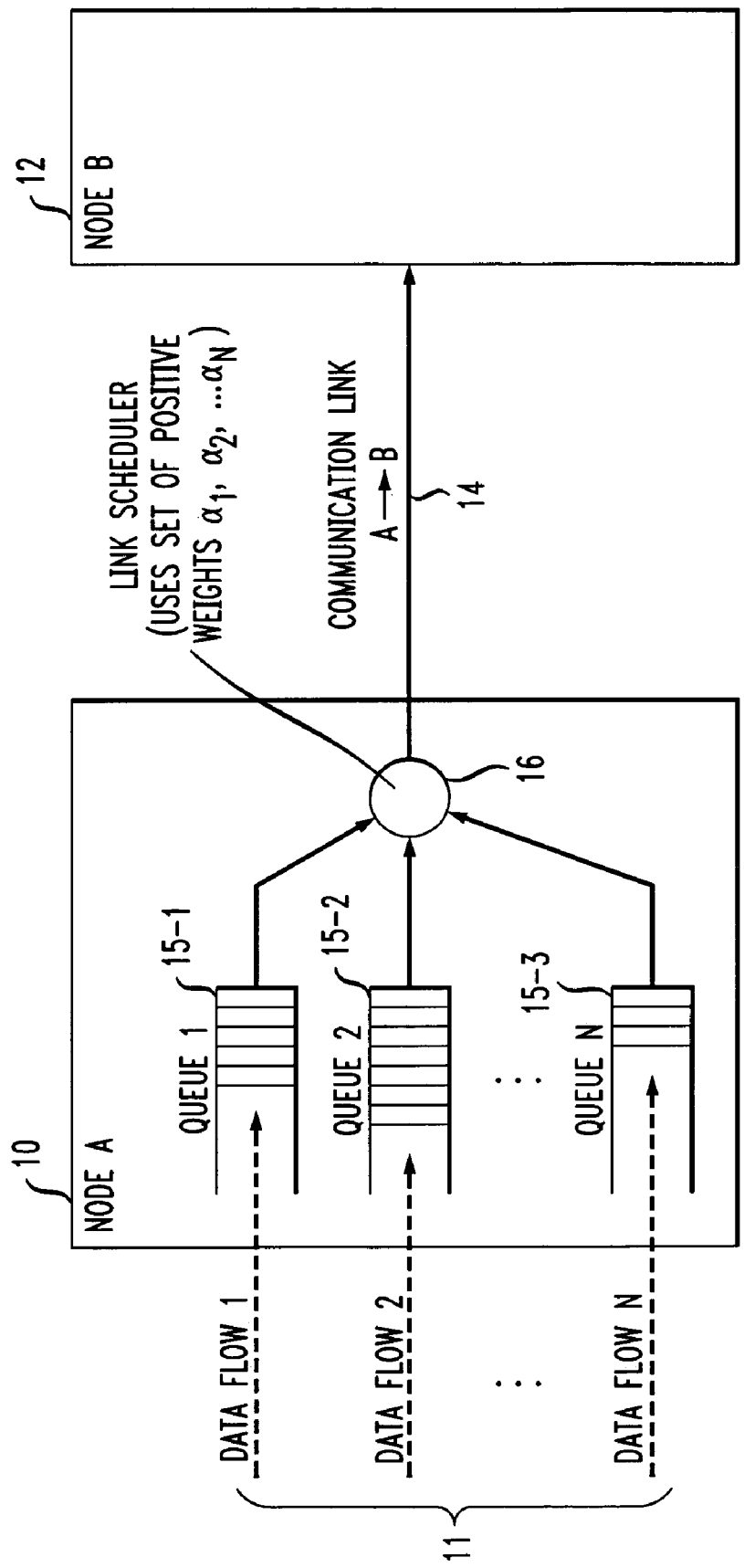
FIG. 1 shows an illustrative embodiment of the invention as implemented in a portion of a communication network.

FIG. 1 shows an illustrative embodiment of the invention as implemented in a node 10 of a communication network. The node 10, also referred to as node A, receives a set of input data flows 11 from, e.g., other nodes or information sources of the network. The node 10 communicates with another node 12, also referred to as node B, via an A→B communication link 14. The nodes 10, 12 and communication link 14 represent portions of the communication network, e.g., nodes 10, 12 may represent computers or other types of digital data processing devices, and link 14 may represent a packet-based transmission medium over which the nodes communicate.

The node 10 as shown in FIG. 1 has N input data flows, each of which is associated with a corresponding class of users and is applied to a corresponding packet queue 15-1, 15-2, . . . 15-N within the node 10. It is assumed without limitation that in the illustrative embodiment each data flow has stationary increments and satisfies a sample path large deviation principle (LDP). LDP techniques are described in greater detail in, e.g., A. Dembo and O. Zeitouni, "Large Deviations Techniques and Applications," 2nd Edition, Springer, 1998, and A. Shwartz and A. Weiss, "Large Deviations for Performance Analysis: Queues, Communication and Computing," Chapman and Hall, New York, 1995. It should be emphasized that the invention does not require these particular assumptions, i.e., embodiments of the invention may be constructed for which the above assumptions and other assumptions mentioned herein do not hold.

The node 10 further includes a link scheduler 16 which retrieves packets from the queues 15-1, 15-2, . . . 15-N for transmission over the link 14. In accordance with the invention, the link scheduler 16 implements a Largest Weighted Delay First (LWDF) scheduling policy based on a set of positive weights $\alpha = \alpha_1, \alpha_2, \ldots, \alpha_N$. Generally speaking, the LWDF scheduling policy associated with the vector $\alpha$ is a non-preemptive policy that always chooses for transmission the user class for which, e.g., the quantity $W_i/\alpha_i$ is maximum, where $W_i$ is the delay experienced by the head-of-the-queue packet of user class i, i.e., the delay experienced by the packet at the head of the queue 15-i in node 10. When all user classes i have the same QoS requirements, the LWDF policy reduces to a well-known conventional first-in first-out (FIFO) policy. Advantageously, the form of the scheduling algorithm in this illustrative embodiment is invariant to changes in stochastic input flow models.

Under the above-noted assumptions that the input flows have stationary increments and satisfy a sample path LDP, and with the further assumption that the system is stable, it can be shown that the LWDF policy of the present invention is asymptotically optimal in the sense that, within a large class of so-called work-conserving policies, it maximizes the quantity $$\min_{i=1,\ldots,N} \left[ \alpha_i \lim_{n \to \infty} \frac{-1}{n} \log P(W_i > n) \right]. \quad (3)$$

The above criterion can be related back to the original QoS requirement (2) by choosing the LWDF weight vector $\alpha$ such that $\alpha_i = -T_i/\log \delta_i$ for $i=1, \ldots, N$. Then the above optimality result shows that the LWDF policy of the invention corresponding to this vector $\alpha$ a maximizes the quantity (2) above within a large class of scheduling policies, in the limit as deadlines $T_i$ get large and acceptable violation probabilities $\delta_i$ get small. In other words, if it is at all feasible to meet the asymptotic QoS constraints (3), then the LWDF policy of the invention will do so. To prove this optimality result, it can be shown that $$\min_{i=1,\ldots,N} \left[ \alpha_i \lim_{n \to \infty} \frac{-1}{n} \log P(W_i > n) \right] = \lim_{n \to \infty} \frac{-1}{n} \log P\left( \max_{i=1,\ldots,N} \frac{W_i}{\alpha_i} > n \right). \quad (4)$$

Thus, the problem of maximizing (3) is reduced to that of maximizing the quantity on the right hand side of (4) above, which can be analyzed using large deviation techniques such as those described in the above-cited LDP references. If the maximal stationary weighted delay $\hat{r}$ is defined to be $$\hat{r} = \max_{i=1,\ldots,N} W_i / \alpha_i,$$

then an LDP can be derived for the sequence of scaled maximal weighted delays. In particular, the quantity (3) under the LWDF scheduling policy can be characterized by a finite-dimensional variational problem. Moreover, an LDP can be obtained for each sequence of scaled stationary delays $W_i$, under the LWDF scheduling policy, and the associated rate functions can be characterized in terms of finite-dimensional variational problems. It should be noted, however, that the invention can be implemented using other types of weights, i.e., weights other than the particular example of $\alpha_i$ given above.

Figure 2:
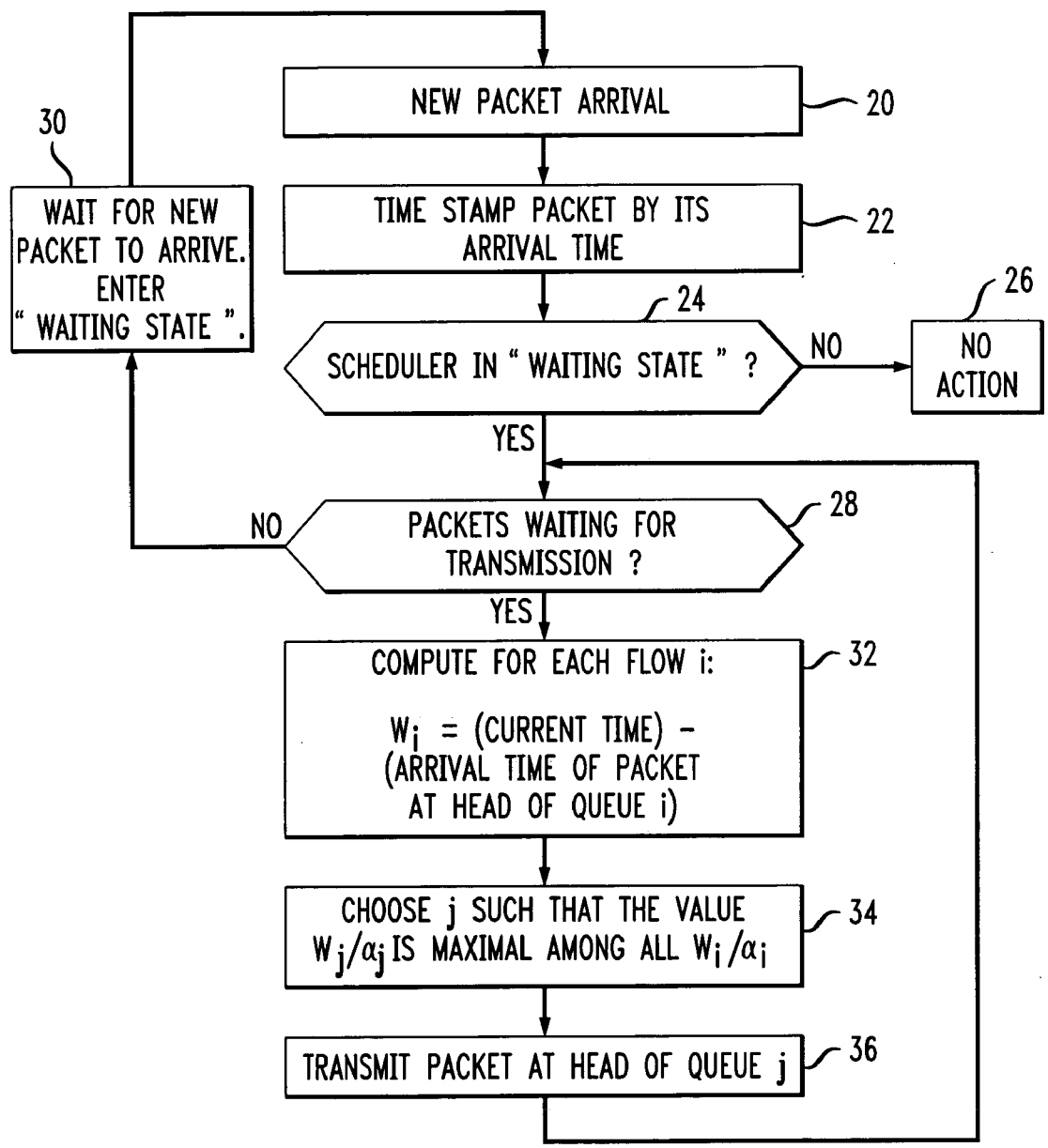
FIG. 2 is a flow diagram of the operation of a link scheduler in the illustrative embodiment of FIG. 1.

FIG. 2 is a flow diagram illustrating the manner in which the above-described LWDF scheduling policy may be implemented in the link scheduler 16 of FIG. 1. In step 20, a new packet arrives in node 10. The packet is time stamped based on its arrival time in the node, as shown in step 22. A determination is then made in step 24 as to whether the link scheduler 16 is in a "waiting state," i.e., a state in which the scheduler is waiting for a new packet to arrive. If the scheduler is not in this state, then no action is taken, as indicated by step 26. If the scheduler is in the waiting state, a determination is made in step 28 as to whether there are packets waiting for transmission. If there are no packets waiting for transmission, the scheduler in step 30 waits for a new packet to arrive and enters the waiting state.

If there are packets waiting for transmission, the scheduler in step 32 computes the delay $W_i$ for each data flow i, i=1, 2, ... N. This delay may be computed for a given data flow, e.g., by taking the current time and subtracting the arrival time of the packet at the head of the corresponding queue 15-i. If a given queue includes no packets, it could be automatically dropped from consideration, or its $W_i$ value could be set to zero. The scheduler in step 34 then determines j, where j=1, 2, ... N, such that the value $W_j/\alpha_j$ is maximal among all $W_i/\alpha_i$ for i=1, 2, ... N, where $\alpha_i$ is given by $\alpha_i=-T_i/\log \delta_i$ as previously described. The scheduler 16 then transmits the packet at the head of the jth queue, i.e., the head-of-the-line packet at queue 15-j. The process of steps 32, 34 and 36 is repeated as long as there are packets waiting for transmission. If two or more j values in step 34 yield the same result, a particular one of the j values may be selected arbitrarily, e.g., the largest of the multiple j values producing the maximal $W_j/\alpha_j$ may be selected.

FIG. 3 shows a portion of an exemplary communication system 100 in which the above-described LWDF scheduling policy may be implemented. The system 100 includes a plurality of nodes 102 which communicate over a network 104. The network 104 may itself be comprised of multiple interconnected nodes, and may represent, e.g., the Internet, a wireless network, a local area network, a wide area network, an intranet, an extranet, a telephone, cable or satellite network, as well as combinations or portions of these and other networks. A given one of the nodes 102, denoted node A, corresponds generally to node A of the FIG. 1 configuration. Node A in this example includes a processor 110 and a memory 112.

The processor 110 may represent, e.g., a microprocessor, a computer, a central processing unit (CPU), an application-specific integrated circuit (ASIC), as well as portions or combinations of these and other suitable processing devices. The memory 112 may represent, e.g., an electronic memory, a magnetic or optical disk-based memory, as well as portions or combinations of these and other memory devices. For example, the memory 112 may represent a memory associated on a common integrated circuit with the processor 110, or a separate electronic memory integrated with the processor 110 into a computer or other device, and may be used to implement the queues 15-i of FIG. 1. The link scheduler 16 of FIG. 1 may be implemented in whole or in part in the form of one or more software programs stored in the memory 112 and executed by the processor 110.

The LWDF approach in the above-described illustrative embodiment of the invention is optimal in the sense that it maximizes the asymptotic rate of decay of the tails of the stationary maximal weighted delay within a general class of scheduling policies. For large delays and small allowed violation probabilities, the LWDF policy with weights $\alpha_i=-T_i/\log \delta_i$ is a nearly optimal policy to use in order to satisfy the QoS constraints given by (1). Thus, whenever it is feasible to satisfy these constraints, one would expect that LWDF would do so. However, in cases when it is not feasible, the LWDF policy will most likely violate the QoS constraints of most users. This has significant implications for flow admission control. Most importantly, LWDF allows one to detect in real time the infeasibility of satisfying QoS requirements. In addition, even when the QoS constraints are infeasible, LWDF has the property of fairness, in that it tries to equalize for all users the ratio of the logarithm of actual violation probability to the logarithm of the desired probability. However, this notion of fairness may or may not be desirable in a particular application. For example, in certain applications, it may be preferable to maintain feasibility of as many users as possible, while penalizing the rest. In such applications, one may want to use the LWDF of the invention for only a subset of flows, while giving lower priority to other flows.

The LWDF scheduling of the invention provides a number of other advantages. For example, it is invariant to changes in stochastic input flow models. In addition, it is suitable for use in a wide variety of communication network applications, including wireless networks, high-speed multimedia networks, call centers, etc.

It should be noted that the above-described results concern stationary delays, rather than stationary waiting times of individual users. Nevertheless, one would expect that the asymptotics of the tails of stationary distributions of both these processes typically coincide. It is therefore believed that similar results would be obtained for stationary waiting times.

The above-described embodiments of the invention are intended to be illustrative only. For example, the invention can be implemented in a wide variety of different data processing devices, using software, hardware or combinations of software and hardware. In addition, other types of delay measures and weights can be used to implement the LWDF scheduling policy. Moreover, the invention maybe used in conjunction with other types of QoS guarantees, including, e.g., guarantees based on packet loss probability. For example, the QoS guarantee may be defined for a delay measure in the form of queue length $Q_i$, i=1, 2, ... N, and an allowed queue length violation probability $\delta_i$. In such an embodiment, the QoS requirement is specified by $P(Q_i > H_i) \leq \delta_i$, and the weights $\alpha_i$ in the set of positive weights $\alpha_1, \alpha_2, \ldots, \alpha_N$ may be given by $\alpha_i=-H_i/\log \delta_i$, where $H_i$ represents an upper bound on the length of the queue. These and numerous other alternative embodiments may be devised by those skilled in the art without departing from the scope of the following claims.

What is claimed is:

1. A processor-implemented method of scheduling data packets for transmission over a communication link in a network, the method comprising the steps of:
    computing delay measures for a plurality of packets including at least one packet from each of a plurality of queues; and
    selecting a given one of the plurality of packets for transmission based at least in part on a comparison of weighted versions of the computed delay measures, such that the selected packet is the packet having the largest weighted delay associated therewith.

2. The method of claim 1 wherein the step of computing delay measures for a plurality of packets includes computing the delay measure for a given one of the packets as a difference between a current time and an arrival time of the given packet in a node of the communication network.

3. The method of claim 1 wherein the plurality of packets comprise N packets, each associated with a corresponding one of N data flows and located in a head position in a corresponding one of N queues.

4. The method of claim 3 wherein the selecting step includes selecting a packet from a head position of a jth one of the N queues, such that a function of a given weight $\alpha_j$ and a given delay measure $W_j$ is maximal among all such functions for $j=1, 2, \ldots N$, where $\alpha_j$ is one of a set of positive weights $\alpha_1, \alpha_2, \ldots, \alpha_N$.

5. The method of claim 4 wherein the function of the given weight and the given delay measure is $W_j/\alpha_j$.

6. The method of claim 4 wherein the computing and selecting steps are configured to meet a quality of service requirement specified in terms of a deadline $T_i$ and an allowed deadline violation probability $\delta_i$.

7. The method of claim 6 wherein each of the weights $\alpha_i$ in the set of positive weights $\alpha_1, \alpha_2, \ldots, \alpha_N$ is given by $\alpha_i = -T_i/\log \delta_i$.

8. The method of claim 6 wherein the quality of service requirement is specified by:

$$P(W_i > T_i) \leq \delta_i \text{ for } i=1, \ldots, N.$$

9. The method of claim 3 wherein the selecting step includes selecting a packet from a head position of a jth one of the N queues, such that a function of a given weight $\alpha_j$ and a given delay measure $Q_j$ is maximal among all such functions for $j=1, 2, \ldots N$, where $\alpha_j$ is one of a set of positive weights $\alpha_1, \alpha_2, \ldots, \alpha_N$, and $Q_j$ is a queue length of the jth queue.

10. The method of claim 9 wherein the function of the given weight and the given delay measure is $Q_j/\alpha_j$.

11. The method of claim 10 wherein the computing and selecting steps are configured to meet a quality of service requirement specified in terms of a maximum queue length $H_i$, and an allowed queue length violation probability $\delta_i$.

12. The method of claim 11 wherein each of the weights $\alpha_i$ in the set of positive weights $\alpha_1, \alpha_2, \ldots, \alpha_N$ is given by $\alpha_i = -H_i/\log \delta_i$.

13. The method of claim 11 wherein the quality of service requirement is specified by:

$$P(Q_i > H_i) \leq \delta_i \text{ for } i=1, \ldots, N.$$

14. An apparatus for use in scheduling data packets for transmission over a communication link in a network, the apparatus comprising:
a set of queues, each of at least a subset of the queues including at least one packet; and
a link scheduler having inputs coupled to corresponding outputs of the queues, the link scheduler being operative to compute delay measures for a plurality of packets including at least one packet from each of the at least a subset of the queues, and to select a given one of the plurality of packets for transmission based at least in part on a comparison of weighted versions of the computed delay measures, such that the selected packet is the packet having the largest weighted delay associated therewith.

15. The apparatus of 14 wherein the link scheduler is further operative to compute delay measures for a plurality of packets includes computing the delay measure for a given one of the packets as a difference between a current time and an arrival time of the given packet in a node of the communication network.

16. The apparatus of claim 14 wherein the plurality of packets comprise N packets, each associated with a corresponding one of N data flows and located in a head position in a corresponding one of N queues.

17. The apparatus of claim 16 wherein the link scheduler is further operative to select a packet from a head position of a jth one of the N queues, such that a function of a given weight $\alpha_j$ and a given delay measure $W_j$ is maximal among all such functions for $j=1, 2, \ldots, N$, where $\alpha_j$ is one of a set of positive weights $\alpha_1, \alpha_2, \ldots, \alpha_N$.

18. The apparatus of claim 17 wherein the function of the given weight and the given delay measure is $W_j/\alpha_j$.

19. The apparatus of claim 17 wherein the link scheduler is configured to meet a quality of service requirement specified in terms of a deadline $T_i$ and an allowed deadline violation probability $\delta_i$.

20. The apparatus of claim 19 wherein each of the weights $\alpha_i$ in the set of positive weights $\alpha_1, \alpha_2, \ldots, \alpha_N$ is given by $\alpha_i = -T_i/\log \delta_i$.

21. The apparatus of claim 19 wherein the quality of service requirement is specified by:

$$P(W_i > T_i) \leq \delta_i \text{ for } i=1, \ldots, N.$$

22. The apparatus of claim 16 wherein the link scheduler is further operative to select a packet from a head position of a jth one of the N queues, such that a function of a given weight try $\alpha_j$ and a given delay measure $Q_j$ is maximal among all such functions for $j=1, 2, \ldots N$, where $\alpha_j$ is one of a set of positive weights $\alpha_1, \alpha_2, \ldots, \alpha_N$, and $Q_j$ is a queue length of the jth queue.

23. The apparatus of claim 22 wherein the function of the given weight and the given delay measure is $Q_j/\alpha_j$.

24. The apparatus of claim 22 wherein the link scheduler is configured to meet a quality of service requirement specified in terms of a maximum queue length $H_i$ and an allowed queue length violation probability $\delta_i$.

25. The apparatus of claim 19 wherein each of the weights $\alpha_i$ in the set of positive weights $\alpha_1, \alpha_2, \ldots, \alpha_N$ is given by a $\alpha_i = -H_i/\log \delta_i$.

26. The apparatus of claim 19 wherein the quality of service requirement is specified by:

$$P(Q_i > H_i) \leq \delta_i \text{ for } i=1, \ldots, N.$$

27. An apparatus for use in scheduling data packets for transmission over a communication link in a network, the apparatus comprising:
a memory implementing a set of queues, each of at least a subset of the queues including at least one packet; and
a processor coupled to the memory and operative to compute delay measures for a plurality of packets including at least one packet from each of the at least a subset of the queues, and to select a given one of the plurality of packets for transmission based at least in part on a comparison of weighted versions of the computed delay measures, such that the selected packet is the packet having the largest weighted delay associated therewith.

28. A machine-readable medium storing one or more software programs for scheduling data packets for transmission over a communication link in a network, wherein the one or more programs when executed by a processor include:
a step for computing delay measures for a plurality of packets including at least one packet from each of a plurality of queues; and
a step for selecting a given one of the plurality of packets for transmission based at least in part on a comparison of weighted versions of the computed delay measures, such that the selected packet is the packet having the largest weighted delay associated therewith.

* * * * *

UNITED STATES PATENT AND TRADEMARK OFFICE
CERTIFICATE OF CORRECTION

| | | |
|---|---|---|
| PATENT NO. | : 7,054,267 B2 | Page 1 of 1 |
| APPLICATION NO. | : 09/393949 | |
| DATED | : May 30, 2006 | |
| INVENTOR(S) | : K. Ramanan et al. | |

It is certified that error appears in the above-identified patent and that said Letters Patent is hereby corrected as shown below:

In the Claims:

Claim 22, col. 8, line 19, delete the word "try".

Signed and Sealed this

Twenty-second Day of August, 2006

JON W. DUDAS
*Director of the United States Patent and Trademark Office*